United States Patent [19]

Ferrigno

[11] 3,793,531
[45] Feb. 19, 1974

[54] ELECTRONIC TREE LIGHT CONTROLLER
[75] Inventor: William L. Ferrigno, Peacedale, R.I.
[73] Assignee: General Electric Company, Providence, R.I.
[22] Filed: Dec. 9, 1971
[21] Appl. No.: 206,360

[52] U.S. Cl. .................. 307/41, 315/185 S, 323/19, 323/24, 323/34, 323/36
[51] Int. Cl. ........................ A47g 33/16, G05f 3/04
[58] Field of Search 307/38, 41; 315/169 TV, 200 A, 315/185 S, 241 S; 323/24, 36, 19, 34

[56] References Cited
UNITED STATES PATENTS

| 3,024,386 | 3/1962 | Chauvineau | 315/241 S |
| 3,440,521 | 4/1969 | Kessler | 323/19 |
| 3,710,182 | 1/1973 | Reenen | 315/200 A |
| 3,710,185 | 1/1973 | Switsen | 315/200 A |
| 3,522,522 | 8/1970 | Tiemann | 323/24 X |
| 3,478,222 | 11/1969 | Gassaway | 307/38 |
| 3,463,986 | 8/1969 | Curriston et al. | 323/24 X |
| 3,146,392 | 8/1964 | Sylvan | 323/24 X |
| 3,495,154 | 2/1970 | Dosch et al. | 323/36 X |

Primary Examiner—A. D. Pellinen
Attorney, Agent, or Firm—Paul E. Rochford

[57] ABSTRACT

An electronic power supply control mechanism is provided to regulate flow of electric power to lights or other loads in pulses where the intensity of the pulse varies with time in a cammed fashion. The control simultaneously permits control of the period or duration of the cammed power pulses to increase and decrease their length as they also undergo their change in intensity with time. This cammed intensity change coupled with change of the duration of the power pulses is achieved by electronic circuitry including a solid state switch, the trigger actuation of which is made responsive to the difference frequency or an oscillator frequency beating against line frequency.

6 Claims, 5 Drawing Figures

ELECTRONIC TREE LIGHT CONTROLLER

The present invention relates to control mechanisms and circuits for controlling the supply of power pulses for energization of lighting and other circuits which pulses have a cammed intensity in the sense that the intensity varies with time in a repeating fashion. More particular it relates to electronic circuitry capable of control of alternating current power supply to produce repeating power pulses of much longer duration and lower frequency than the frequency of alternation of the alternating current of the power supply. It also relates to circuitry by which pulses of variable intensity and duration may be supplied to lighting or other equipment and by which the intensity and duration characteristics may also be varied.

Cams are known in the art of cyclic control of power or force being supplied to an electric load or in carrying out a process. Generally a cam may be employed to provide a cyclic variation in the intensity of a force or other applied energy with time.

It is known that the use of lights for decorative purposes or for advertising purposes frequently makes desirable the control of the supply of the electric power to the lights to permit periodic interruption or fluctuations of the power level of the lights. For example one of the familiar pulsing controls employed frequently with Christmas lights is the so-called flasher. Such a control periodically interrupts the flow of current to the lights so that the lights are on for a period of time and off for a period of time in a repeat pattern which is regarded by the user of such flashers an enhancement of the lighting effect produced.

In Christmas lights there is also a type of light bulb which has a current interrupter built into it so that the flow of current to that bulb, and to other light bulbs in series with it on a light string, may be interrupted and made periodic or pulsed. The power interrupter of such flash pulsers normally involves movement of a bimetal which interrupts the current when it becomes heated and pulls away from an electric contact.

As presently employed flashers of the type described above have a frequency which depends on the particular heating characteristics of the bimetal which opens and closes the power supply circuit and provides the power supply interruption action. When this element reaches thermal equilibrium during operation the frequency of pulsing is essentially constant or there is at least no simple way by which the frequency or duration of the pulses of current flowing to the electrical load, such as a motor or light bulbs, may be changed so that they will be made faster or slower according to the desires of the operator or party employing the flashing lights.

Means for changing the periodicity of flashers which are known in the art are relatively expensive or cumbersome so that they have not found wide acceptance in applications which do not have a sophisticated control mechanism available. For example in applications in the home during holiday lighting for example Christmas trees or lighting of strings of light employed within a home or patio or during festive occasions the user relies on use of a simple bimetal activated flasher unit and the frequency or periodicity of the flashing of the unit, once thermal equilibrium is established for the unit, does not vary.

However, the frequency at which the strings of light can be made to flash and the characteristics of the turn on and turn off of the light is frequently less pleasing in a particular lighting application than is desirable. Use of decorative lighting having pulsed light supply has been limited as for example in a home or in a school and decorations at a school dance or something to that effect simply because the esthetic effects achieved are not suitable or adequate for the application being made or proposed for the pulsed lights.

SUMMARY OF THE INVENTION

A power pulse generator is provided to receive alternating current from a conventional AC source and to convert it into power pulses of longer duration than the duration of the alternating current pulse or cycle of the conventional source. The generator unit has a pair of power supply terminals for connecting it to a source of alternating current and a pair of load terminals for connecting it to a load to supply the pulses to the load.

Internally it has a first power line connected from a first of the power supply terminals to a first of the load terminals and a solid state switch connected into the power line to control flow of electric power through the line. The solid state switch has a normal high impedance state and is capable of being changed to a low impedance state responsive to receipt of a trigger signal to trigger conductivity of the switch. A second power line extends between the second power supply terminal and the second load terminal. The pulse generator includes an oscillator circuit and a power supply circuit to supply power to the oscillator circuit, the power supply circuit being connected between the second power line and the portion of the first power line between the power supply terminal and the solid state switch. The generator also includes trigger means for actuating the solid state switch from its high impedance to its low impedance state, and the trigger is coupled to the oscillator circuit to initiate conduction of the solid state switch responsive to signals generated by the oscillator circuit.

It is accordingly one object of the present invention to provide improved means for interrupting flow of electric power to an electric load to make the power supply periodic in nature and of variable periodicity.

Another object is to provide electronic means for varying flow of electric power to an electric load in which the variation is gradual and cyclic in nature.

Still another object of the present invention is to provide a low cost electronic circuit for interrupting supply of power to a load in which the interruption is more gradual than in devices used heretofore in power interruption for controlling decorative lighting.

A further object is to provide an electronic circuit having the capability of interrupting the flow of electric power to lighting circuits where the interruption may be made gradual in either the turn on or actuation of the flow of power or may be made gradual in the turn off or termination of flow of power to the decorative lighting to achieve novel decorative lighting effects.

Other objects and advantages will be in part apparent and in part pointed out in the description which follows.

Some manners in which the invention may be carried into effect are described with reference to the accompanying drawings in which:

3,793,531

Figure 1:
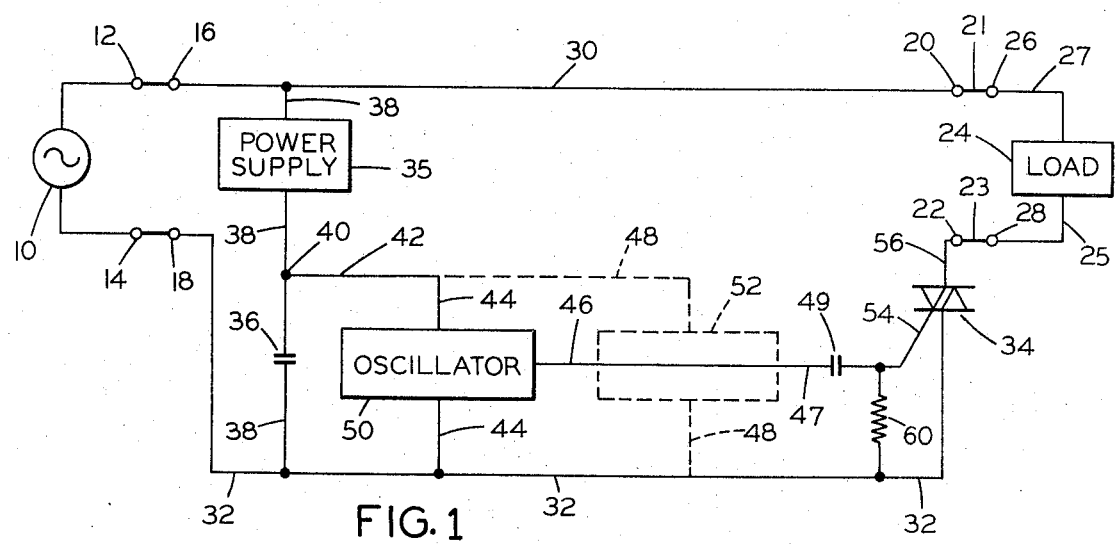
FIG. 1 is a schematic drawing illustrating in both block form and in electronic components elements constituting part of a pulsed power supply according to the present invention.

Referring first to FIG. 1 there is shown a source of alternating current 10 which supplies alternating current through terminals 12 and 14. This may be for example a source of conventional 60 cycle 120 volt alternating current as supplied to homes and commercial buildings in the United States or a source of 50 cycle higher voltage alternating current power as supplied in some European countries.

The power from source 10 is fed to a pulsed power supply unit through power supply terminals 16 and 18.

Pulses of power are delivered from the power supply unit from a second pair of terminals of the unit, specifically load terminals 20 and 22. Load terminals are shown as part of a power supply unit according to this invention and power pulses from the unit may be supplied from the unit to a load such as 24 through its terminals 26 and 28.

Extending between power supply terminal 16 and load supply terminal 20 is a first power line 30 of the unit.

Extending between the other power supply and load supply terminals 18 and 22 is a second power line 32.

A solid state switch 34 is incorporated in line 32 and this switch cotrols flow of power current through the power pulse generator.

A power supply 35 is connected between the two power lines 30 and 32 of the unit. A condensor 36 is included in the power supply line 38 below the junction 40. Supply of the power from power supply 34 to an oscillator is made through line 42. Characteristics of power supplied from supply 34 depend on the needs of the oscillator to which it is to supply power.

For a transistor oscillator the power may be supplied at 6 or 10 volts whereas for a neon oscillator the power is preferably supplied at more than 70 volts the power level at which the neon switch turns on. A voltage of 100 volts may be furnished from such a power supply for example.

Referring again to FIG. 1 the next element of the circuit which constitutes an essential element is an oscillator 50. Oscillator 50 is fed power from line 42 and is accordingly connected between line 42 and power line 32 in line 44.

The output of the oscillator is fed through line 46 to the next element of the unit.

The oscillator itself may be one of a variety of oscillators capable of oscillating at a frequency close to that of the frequency of alternation of the alternating current power supplied from source 10. Some suitable oscillators are described illustratively with reference to the figures below. Others are known in the art.

The output of the oscillator may be fed directly to a trigger circuit of a solid state switch such as 34 through a line such as 46. Alternatively it may be fed, depending on the condition of the signal from the oscillator, through an amplifier such as that represented in phantom by box 52.

Amplifier 52 may be omitted for example where a neon oscillator is employed but is preferably included where a multi-vibrator or similar transistor oscillator is employed as oscillator 50. Power to an amplifier such as 52 may be provided through a line from power supply 34 such as line 48 also shown in phantom.

In the particular solid state switch 34 shown the trigger is built into and forms a part of the unit.

Trigger lead 54 conducts a trigger signal to the switch to render it conducting. Such a trigger signal is received through line 47, capacitor 49 and line 54.

It will be understood that line 46 and 47 although shown as solid in FIG. 1 is only a solid uninterrupted conductor if an amplifier such as 52 is not included in the line. Where the amplifier 52 is included in the unit the line is interrupted in the area included within the dashed lines of amplifier 52 so that conductor section marked as 46 carries the signal to the amplifier and conductor section marked as 47 carries the amplified signal from the amplifier.

Where the amplifier 52 is absent conductor 46, 47 is a single solid conductor between oscillator 50 and capacitor 49.

In any event a trigger signal to switch 34 will cause it to change from a high impedance state to a low impedance state within a very short time span which, in practical operating terms, is a very small portion of a single half cycle of the alternating current being supplied to the unit from AC source 10.

With solid state switch 34 in its low impedance or conducting state, power is supplied through conductor 56 and terminals 22 and 28 to load 24 through conductors 23 and 25. The power circuit for supply of power to load 24 is completed through conductors 27 and 21 terminals 20 and 26 and power line 30 leading back to the power source 10.

A resistor 60 is positioned in a conductor connecting trigger lead line 54 and power line 32.

In FIG. 1 the general arrangement of the elements and components of a pulsed power supply is shown. Where the oscillator of this unit oscillates at a frequency close to the frequency of alternation of the AC power supplied to the unit, there is a progressive change in the length of time within each successive half cycle during which the switch 34 is in its low impedance or conducting state. This progressive change is progressive in the sense that the change proceeds in one direction over a span of time including at least several, and usually a large number of half cycles, and the increment of change of the period of conduction of switch 34 is approximately the same as between consecutive pairs of half cycles during the span of time.

The changes in the period of conduction may progressively increase or may progressively decrease during a series of successive half cycles. If the period of conduction increases progressively then the amount of power being delivered to a load such as 24 through the solid state switch 34 will progressively increase during the series of half cycles. If the load 24 is a lamp load, for example, the progessive increase in the period of each half cycle during which the switch 34 is conducting will result in the lamps becoming progressively brighter over the period of time covered by the series of half cycles.

If the increment of increased conduction is sufficiently small the period during which the solid state switch will be progressively increasing in its period of conduction may last a few seconds and the brightening of this lamp load will be readily evident to one observing the lamp with unaided vision.

The period of such brightening is dependent on the difference between the 60 cycles at which the AC power is supplied and the number of oscillations per second at which the oscillator feeds trigger signals to the solid state switch.

Figure 2:
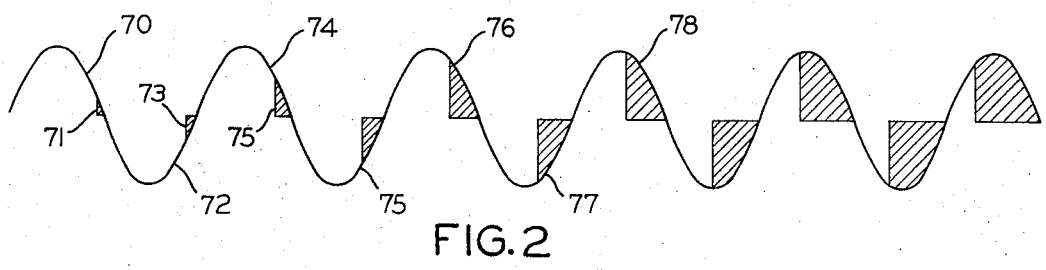
FIG. 2 is a plot of current flow plotted as an ordinate against time plotted as an abcissa and illustrates the increasing supply of power with time.

The progessive increase in duration of conductivity of a switch such as 34 is illustrated in FIG. 2.

The illustration is for an oscillator frequency which is greater than 60 cycles per second. The oscillator generates turn-on signals at a grequency of greater than 60 cycles per second and the power flow through a switch, such as 34, occurs during that portion of each half cycle of the power cycle after the switch is turned on.

As is indicated, during the first half cycle 70 of FIG. 2 the power is on during a short portion only at the end of the half cycle. As the power passes through zero the solid state switch returns to its high impedance nonconducting state.

During the second half cycle the period of the power cycle remains at 1/60 of a second. However, because the oscillator operates at a slightly higher frequency the time until it triggers the power flow in switch 34 is less than the 1/60 of a second between the time representing the point in the first half cycle at which the switch was turned on during the first half cycle and the same period or point in the second half cycle. Because the switch is turned on within a shorter period than the 1/60 of a second the turn on occurs before the point at which conduction was initiated during the first half cycle. Accordingly greater power is delivered during the second half cycle than during the first.

As is evident from FIG. 2 a greater time during which power is delivered, and a greater shaded area representing the greater power delivered is shown in half cycle 72 than during half cycle 70.

During the third half cycle 74 a still greater time of conduction and a still greater shaded area under the curve representing the still greater power delivered to the load is shown.

With each progressive half cycle 75, 76, 77, and 78 still greater conducting times and still greater quantities of delivered power are represented.

Accordingly it is evident from FIG. 2 that a progressively increasing power may be delivered to a load employing the circuit of this invention and that the rate of increase of power delivered is not a linear increase with time inasmuch as the shaded area of the curve does not represent a linear increase even though the change in time at which conduction of the solid state switch is initiated is changed linearly from one half cycle to the next.

Unique decorative effects are achieved by use of a pulsed power supply in supplying pulses of power which gradually build up in power delivered over a period of time. Where an oscillator frequency of 60.1 oscillations per second is used in initiating conduction of a solid state switch, the cycle for build up of power and eventual turn off of the solid state switch lasts about 10 seconds. In other words about 10 seconds lapse from the time the power level is at one specific value until the power again reaches this same specific value in the succeeding power pulse delivered from a unit as described with reference to FIG. 1.

Referring again now to FIG. 2 it will be evident that as this figure was drawn for illustrative purposes only about 16 full cycles of the alternating current power are needed for the completion of a single power pulse or in other words for the turn on to occur in precisely the position shown in half cycle 70 of FIG. 2.

There will be in effect two pulses delivered during this period, a first pulse as the line 71 representing actuation of a solid state switch moves from right to left across the positive half of the successive power cycles, and the second as this same line moves from right to left across the negative half of the succeeding set of power cycles. In other words the light will come on progressively and then extinguish at the end of the first eight full power cycles. During the second eight full power cycles the light will come on again progressively and following full power illumination will extinguish. Only after the second pulse will the line 71 again be in approximately the position shown in FIG. 2.

The occurrence of this double pulse will perhaps not be discernable in lighting effects produced, particularly with incandescent lights having heavier filaments. However, the distinction between a double pulse and a single pulse becomes more apparent if the power supply to the lamp is pulsed direct current or where other means are employed to make the double pulse nature of the pulses clearer.

This may be accomplished for example by setting the oscillator to oscillate at about 30 oscillations per second rather than at about 60. When set for 30 oscillations per second then the time gap between trigger pulses which will turn on the solid state switch will be about equal to that represented by the distance between lines 71 and 75 rather than that represented by the distance between lines 71 and 73.

It is evident that with this lower frequency or longer oscillation time the initiation of conduction will occur first only during the positive half cycles and then next only during the negative half cycles.

After having completed one full cycle, including a pulse from the positive half cycles and a pulse from the negative half cycles, the pulses are repeated in this same sequence so long as the AC power is supplied and so long as the oscillator produces triggering pulses at about half the frequency of the 60 cycle power supply.

Figure 5:
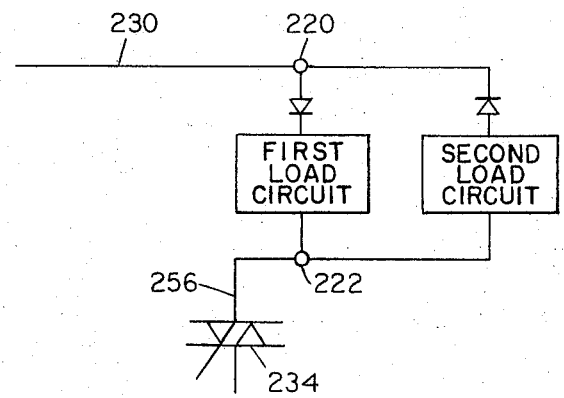
FIG. 5 is an alternate form of load circuit which may be utilized with the present invention.

As shown in FIG. 5 with the use of a pair of oppositely oriented diodes in two lines extending from solid state switch, it is possible to have a first power pulse pass through a line with one of the diodes and to then have a subsequent pulse pass through the other line having the oppositely directed diode incorporated in it.

In other words it is feasible to power two separate loads with sequenced pulses so that first one load receives a power pulse through one of the diode containing power lines and then the other load receives a subsequent pulse through the other power line containing a diode connected in an opposite orientation therein.

In the particular illustration shown the solid state switch is one which is turned on through a trigger lead 54 and which is capable of conducting in either direction once it is turned on.

However, it will be realized that the switch may be a silicon controlled rectifier or a pair of silicon controlled rectifiers connected in reverse parallel into the circuit of the unit.

Further the solid state switch may be of the type which has no separate trigger lead or trigger electrode but which is actuated by a pulse or spike sent to the switch directly through the power line such as 32.

Referring briefly back now to FIG. 1 the function of the capacitor 49 is understood to be that of preventing any direct current from the oscillator or amplifier from being impressed directly on the trigger electrode of solid state switch 34.

Figure 3:
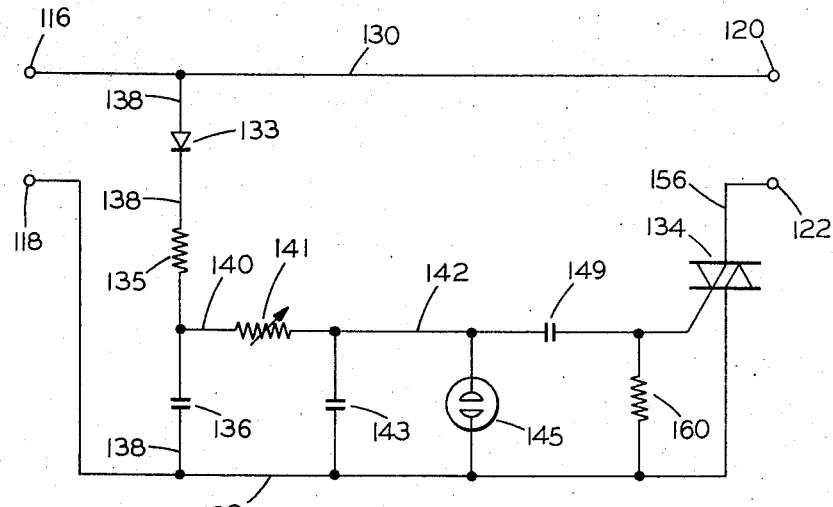
FIG. 3 is a circuit diagram of a pulsed power supply unit incorporating a neon oscillator.

Referring next now to FIG. 3 a preferred form of low cost elements are shown joined in a novel combination pursuant to this invention. Power supply electrodes 116 and 118 correspond to similar elements 16 and 18 of the unit of FIG. 1. Power lines 130 and 132 conduct power to load terminals 120 and 122 respectively. Power supplied to terminal 122 must pass through solid state power switch 134 and control of power flowing through this switch is achieved by the control circuitry connected between power lines 130 and 132.

A power supply comprises diode 133 and resistor 135 in line 138. A capacitor 136 in line 138 prevents flow of direct current to line 132. Power is fed through line 140 to the neon oscillator portion of the power pulse unit.

The neon oscillator comprises a resistor 141 in series in line 140, capacitor 143 and neon switch 145 connected in parallel between power supply line 142 and power line 132.

Resistor 141 and capacitor 143 comprise an RC phase shift network which controls the frequency of oscillation of neon switch 145.

By making resistor 141 variable the rate of oscillation of switch 145 can be adjusted.

As indicated above when used in lighting applications the preference is for oscillation at a frequency close to the frequency of alternation of the AC of the power supplied to the unit. Alternatively the frequency can be set at one half the alternation rate of the AC power or at some other distinct fraction or multiple which can produce distinctive lighting effects.

Where the power pulses are to be employed from some other application as for example control of the speed of a motor then other frequencies may be useful depending on the particular application to be made.

Capacitor 149 and resistor 160 perform essentially the same functions performed by capacitor 49 and resistor 60 of the unit of FIG. 1. Specifically capacitor 149 prevents DC voltage from the oscillator of the unit from reaching the trigger lead. Also resistor 160 provides a return path for charges which may build up on the trigger lead.

Figure 4:
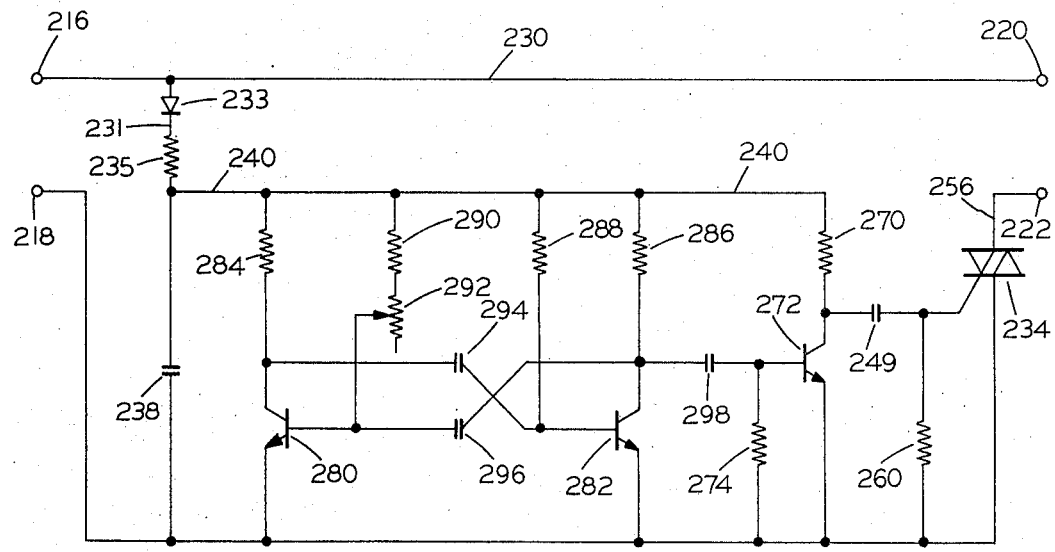
FIG. 4 is a circuit diagram of an alternative form of unit incorporating a multi-vibrator oscillator.

Another form of the unit is that shown in FIG. 4.

Referring next to this unit it is evident that the power supply terminals 216 and 218 correspond to terminals 16 and 18 of FIG. 1. Further load terminals 220 and 222 correspond to similarly numbered terminals 20 and 22 of FIG. 1. Power lines 230 and 232 also have essentially the functions described in FIGS. 1 and 3.

Power supply comprising diode 233 and resistor 235 furnish power through line 231 to oscillator input line 240. The oscillator of the unit is of the multi-vibrator variety and comprises the two transistors 280 and 282 and resistors 284 and 286 feeding power to the collectors of these transistors. Also resistors 288 and 290 and variable resistor 292 coupled with capacitors 294 and 296 apply bias voltage to the bases of the transistors 280 and 282.

The oscillator signal from the oscillator described above is fed through capacitor 298 to an amplifier. Amplifier comprises a resistor 270, fed through power supply line 240, and itself feeding current to the collector of transistor 272. Oscillator output is filtered through capacitor 298 and is applied to the base of transistor 272. Resistor 274 permits drain of accummulated voltage.

The remainder of the components of the unit are essentially the same as and perform essentially the same functions as their similarly numbered counter parts in the previously described units.

What is claimed is:

1. A power control circuit for varying the flow of current through a load in a repetitive cammed fashion, comprising:
   first and second input terminals for connecting said circuit to a source of alternating current of a first frequency, and first and second output terminals for connecting said circuit to a load,
   means interconnecting said first input terminal and said first output terminal,
   a solid state switch between said second input terminal and said second output terminal, said solid state switch including a trigger element,
   an oscillator operable at a second frequency other than said first frequency,
   means providing power to said oscillator from said first and second input terminals, and
   means for connecting the output from said oscillator to said trigger element of said solid state switch to effect a repetitive camming operation of current flowing through said switch.

2. The power control circuit as defined in claim 1 and in which the frequency of said oscillator is variable.

3. The power control circuit as defined in claim 1 and in which the oscillator is a neon oscillator.

4. The power control circuit as defined in claim 1 and in which the solid state switch is a bidirectional switch.

5. The power control circuit as defined in claim 1 and in which the oscillator is a multi-vibrator and an amplifier is provided between the oscillator output and the trigger element of said solid state trigger element.

6. The power control circuit as defined in claim 1 and wherein the load comprises a first load circuit and a second load circuit, said first load circuit including a series diode poled in a first direction and said second load circuit including a series diode poled in a second direction.

* * * * *